(12) United States Patent
Andersson et al.

(10) Patent No.: US 9,909,493 B2
(45) Date of Patent: Mar. 6, 2018

(54) ASSEMBLY HAVING A GAS TURBINE ENGINE AND A PREHEATING ARRANGEMENT

(71) Applicant: Siemens Aktiengesellschaft, Munich (DE)

(72) Inventors: Mats Andersson, Norrkoping (SE); Jacek Janczewski, Norrkoping (SE); Olle Lindman, Finspang (SE); Magnus Persson, Svartinge (SE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 252 days.

(21) Appl. No.: 14/767,304

(22) PCT Filed: Jan. 17, 2014

(86) PCT No.: PCT/EP2014/050864
§ 371 (c)(1),
(2) Date: Aug. 12, 2015

(87) PCT Pub. No.: WO2014/124777
PCT Pub. Date: Aug. 21, 2014

(65) Prior Publication Data
US 2016/0003141 A1 Jan. 7, 2016

(30) Foreign Application Priority Data

Feb. 15, 2013 (EP) .................................. 13155455

(51) Int. Cl.
| | |
|---|---|
| *F02C 1/05* | (2006.01) |
| *F02C 1/06* | (2006.01) |
| *F03G 6/06* | (2006.01) |
| *F02C 3/04* | (2006.01) |
| *F02C 7/22* | (2006.01) |

(Continued)

(52) U.S. Cl.
CPC .................. *F02C 1/05* (2013.01); *F02C 1/06* (2013.01); *F02C 3/04* (2013.01); *F02C 7/222* (2013.01);

(Continued)

(58) Field of Classification Search
CPC ...... F02C 1/05; F02C 1/06; F02C 3/04; F02C 7/08; F02C 7/222; F02C 7/224;
(Continued)

(56) References Cited

U.S. PATENT DOCUMENTS

| | | | |
|---|---|---|---|
| 3,656,298 A | * | 4/1972 | Wade ....................... F02C 3/34 |
| | | | 431/116 |
| 4,509,333 A | | 4/1985 | Nussdorfer |

(Continued)

FOREIGN PATENT DOCUMENTS

| | | |
|---|---|---|
| EP | 2436977 A1 | 4/2012 |
| WO | 0068616 A1 | 11/2000 |
| WO | 2004011789 A1 | 2/2004 |

OTHER PUBLICATIONS

Barigozzi G et al., Thermal performance prediction of a solar hybrid gas turbine, Solar Energy, Pergamon Press, Oxford, GB, vol. 86, No. 7, Apr. 18, 2012, pp. 2116-2127.

(Continued)

*Primary Examiner* — Steven Sutherland
(74) *Attorney, Agent, or Firm* — Beusse Wolter Sanks & Marie (57) ABSTRACT

An assembly includes a gas turbine and a heat exchanger for heating up a gas turbine process fluid by thermal energy. The gas turbine has a compressor, a combustor and a turbine downstream of the combustor, wherein the thermal energy is from the solar receiver. To improve efficiency and reduce power generation fluctuations, the assembly includes a first line to conduct the gas turbine process fluid downstream a compression by the compressor to the heat exchanger, and a second line to conduct the gas turbine process fluid from the heat exchanger to the combustor to generate hot combustion gas from the warmed up gas turbine process fluid burning fuel in the combustor.

12 Claims, 5 Drawing Sheets

(51) Int. Cl.
  F02C 7/224    (2006.01)
  F23R 3/00     (2006.01)
  F23R 3/34     (2006.01)
  F23R 3/28     (2006.01)

(52) U.S. Cl.
  CPC .............. *F02C 7/224* (2013.01); *F03G 6/064* (2013.01); *F23R 3/005* (2013.01); *F23R 3/28* (2013.01); *F23R 3/343* (2013.01); *F05D 2220/32* (2013.01); *F05D 2240/35* (2013.01); *Y02E 10/46* (2013.01)

(58) Field of Classification Search
  CPC .... F03G 6/04; F23R 3/005; F23R 3/28; F23R 3/343; F23R 3/54
  See application file for complete search history.

(56) References Cited

U.S. PATENT DOCUMENTS

| | | | |
|---|---|---|---|
| 5,305,608 A * | 4/1994 | Loving | F23R 3/005 431/353 |
| 6,895,760 B2 * | 5/2005 | Kesseli | F02C 3/20 60/723 |

OTHER PUBLICATIONS

Maya Lavshits et al., Solar hybrid steam injection gas turbine (STIG) cycle, Solar Energy, Pergamon Press, Oxford, GB, vol. 86, No. 1, Sep. 21, 2011, pp. 190-199.

* cited by examiner

ASSEMBLY HAVING A GAS TURBINE ENGINE AND A PREHEATING ARRANGEMENT

CROSS REFERENCE TO RELATED APPLICATIONS

This application is the US National Stage of International Application No. PCT/EP2014/050864 filed Jan. 17, 2014, and claims the benefit thereof. The International Application claims the benefit of European Application No. EP13155455 filed Feb. 15, 2013. All of the applications are incorporated by reference herein in their entirety.

FIELD OF INVENTION

The invention relates to an assembly comprising a gas turbine and a solar receiver, said gas turbine comprising a compressor, a combustor and a turbine downstream said combustor, said solar receiver comprising a heat exchanger for heating up a gas turbine process fluid by thermal energy from said solar receiver.

BACKGROUND OF INVENTION

With increasing popularity of renewable energy exploitation hybrid devices—combing fossil and renewable power generation—like the incipiently mentioned assembly enter the focus of interest in the field of power generation. Renewable energy including solar energy naturally leads to unwanted power generation fluctuation to be compensated. These hybrid devices aim to reduce fossil fuel consumption and power generation fluctuations coming with renewable power generation.

A combination of a gas turbine with a solar receiver as defined incipiently is assumed to be prior art.

Solar receivers for gas turbines as defined above have a limited maximum temperature at around 800° C. to 1000° C. Since the gas turbine inlet temperature for modern gas turbines is around 1200° C. to 1500° C. and since the efficiency of a gas turbine (upper limit is Carnot efficiency $\eta_c = 1 - T_{min}/T_{max}$) depends on the maximum temperature operating a gas turbine—a reduced maximum inlet temperature of 1000° C. results in a significant efficiency reduction of the gas turbine. It is therefore reasonable to provide a supplementary combustion downstream the solar receiver to achieve an adequate turbine inlet temperature. This supplementary combustion also covers for situations with less solar energy to operate the gas turbine with a reasonable efficiency by said supplementary combustion.

When a conventional combustor is placed downstream said solar receiver it receives gas of much more elevated temperature than it would receive from a normal gas turbine compressor in a conventional layout. These circumstances exclude existing combustion systems which might experience an elevated risk of combustion instability such as auto ignition and flashback. Existing combustion systems also give a comparatively high pressure drop and experience higher metal temperature than designed for if being part of such an assembly. A further issue is that the fuel to air ratio is much lower than in existing combustions systems resulting in a higher likelihood of instability.

SUMMARY OF INVENTION

It is therefore an object of the invention to provide an assembly capable of generating power with less power fluctuation involving solar energy.

It is another object of the invention to increase the thermal efficiency of the incipiently defined assembly.

The objects are solved according to the invention by an assembly of the incipiently mentioned type with the additional features of the independent claims. The respectively dependent claims deal with additional embodiments of the invention.

The gas turbine as part of the assembly can be of conventional type. The combustor of said gas turbine however is to be modified according to the invention. The combustor may be of a silo type, which is beneficially arranged next to a rotor axis of said gas turbine. Said combustor can be split into several modules, wherein said gas turbine process fluid—for example ambient air—is split into several portions upstream entering said silo combustor modules and downstream joining together to be expanded in said turbine of said gas turbine.

According to an exemplary embodiment, the heat exchanger of the assembly is a part of a solar receiver.

Said solar receiver may be of the type, which is mounted to the top of a receiving tower and being located in the focus of several solar reflectors collecting solar radiation to be focusedly reflected towards said receiver. Said solar receiver can directly heat-up said gas turbine process fluid or can be operated by a second cycle of a heat exchanger fluid exchanging heat with the gas turbine process fluid by means of said heat exchanger. If said solar receiver directly heats up said gas turbine process fluid the heat exchanger is meant to be essentially said solar receiver directly heating up said gas turbine process fluid by solar.

A further embodiment of the invention provides said combustor of said gas turbine to be capable to operate said turbine of said gas turbine exclusively—without support of said solar receiver—at full load. This possibility enables operation of said gas turbine with increased efficiency during periods of very low solar radiation incidence. Such an operation mode is considered an exclusive fossil operation mode. The fossil operation can be fueled with fossil or renewable fuel.

Said gas turbine has at least one rotor of said turbine of said gas turbine. The gas turbine may comprise two rotors if it is designed as a twin shaft machine, wherein advantageously the compressor and a part turbine driving said compressor maybe operated at variable speed. In particular the remaining part of the turbine, often called power turbine—which is the turbine driving for example a generator—is advantageously operated at a fixed speed during steady state operation. Said turbine comprises a rotor which advantageously is connected to at least one generator to generate power at variable speed. In particular a frequency converter is electrically connected to said generator converting the electrical energy generated by said generator to a standard electrical net frequency.

A still further embodiment—especially for single shaft gas turbines—is provided with an inlet guide vane apparatus to said compressor of said gas turbine to optimize the efficiency during part load operation.

In addition or as an alternative to said variable guide vane apparatus the compressor can be provided with at least one—or in particular several—variable stage extractions extracting a variable portion of gas turbine process fluid at least at one location of the compressive flow path through the compressor, for example between two compressor stages (here stage means row vane+row blade) and re-injecting said gas turbine process fluid at least partially at an upstream compressor process fluid flow path location. The injection may be in the inlet of the compressor.

One further embodiment of the invention provides said combustor being defined by a first shell element containing a main combustion zone, wherein said combustor is at least partly surrounded by a second shell element to provide an annular channel as a part of said first line conducting the gas turbine process fluid towards said solar receiver. This arrangement enables cooling of said combustor by compressed gas turbine process fluid especially to increase the combustion temperature beyond material properties of the cooled combustor parts to increase efficiency and the lifetime of these cooled parts (e.g. the first shell element).

Further the thermal energy from the cooling is transferred to the gas turbine process fluid to be heated up in the solar receiver heat exchanger. In particular said first and said second line—especially the flow of said gas turbine process fluid through the annular channel defined by said first shell and said second shell is directed contrary to the flow through said second line respectively through the combustor to cool the combustor more efficiently at locations where the highest temperatures are to be expected.

Beneficially this counter-flow-direction design co-insides with the requirement to install said solar receiver on the top of a solar tower, especially if no intermediate heat exchanger medium between said gas turbine process fluid and the solar receiver is provided.

Particularly said combustor comprises a burner upstream of said main combustion zone to supply said fuel by main fuel nozzles and ignite and/or maintain combustion by a pilot injector. Said pilot injector is provided with a portion of the total fuel consumption of approximately 0% to 40%. In particular said pilot injector is designed to provide a diffusion type flame without premixing of fuel and said gas turbine process fluid. The majority of fuel during operating advantageously is injected after ignition by usage of said main fuel nozzles. In particular at least one of said pilot fuel injectors is installed near to an igniter to enable easy ignition of said gas turbine under all operating conditions.

Particularly said pilot injectors can be distinguished from said main fuel nozzles by their inclination to a central axis extending along (in particular parallel) a main flow direction of said gas turbine process fluid through said combustor. Said pilot injectors may inject said fuel along a first inclination angle $\alpha 1$ to said central axis between 0° and 45°. Said main fuel injection nozzles advantageously inject said fuel along a second inclination angle $\alpha 2$ to said central axis, wherein $\alpha 2$ is bigger than $\alpha 1$. Good results can be achieved if $\alpha 1$ is below 10° and $\alpha 2$ between 45° and 120°. In particular the injection of the main fuel through said main fuel nozzles is perpendicular to said main flow direction ($\alpha 2=90°$).

One further embodiment provides a burner comprising several fuel injection devices respectively comprising at least one pilot injector and/or one main fuel nozzle and respectively connected to a fuel supply line, wherein said fuel injection devices are arranged in an axial plane perpendicular to said central axis. Said devices can be arranged in this axial plane in a two dimensional matrix-like pattern. In particular said fuel injection devices respectively occupy a part area of a cross section area perpendicular to said central axis of said combustor. The flow of said gas turbine process fluid is therefore forced to pass through the remaining free cross sectional area of said first line respectively said combustor. A front face of said part area facing opposite the flow of said gas turbine process fluid may be beneficially covered by a flow contour. This flow contour is advantageously extending axially and shaped such that a constriction of said free cross sectional area defined by said fuel injection devices is constricting the flow cross section continuously along at least a part of the axial extension of said fuel injection devices' flow contour. In particular said flow contour can have a smooth three dimensional shape over at least a part of its axial extension. This shape might be partially convex. An alternative comprises an upstream concave portion and a downstream convex portion of said flow contour to enable harmonious acceleration of the gas turbine process fluid flowing through the gaps between the fuel injection devices. The respective shape of the flow contour decreases the pressure loss caused by the constriction of said fuel injection devices.

Further the supplementary heat generation, respectively the combustor according to the invention downstream said solar receiver may be designed to exclusively operate the gas turbine during night when no solar energy is available. Under these conditions said solar receiver may be bypassed by means of at least one valve, in particular several valves to lead the compressed gas directly into the combustor or to an alternative combustion system to generate hot gas to be expanded in said turbine.

To have an improved mixing of said fuel with said gas turbine process fluid downstream said fuel injection devices it is advantageous that an enlargement of said free cross sectional area downstream said may fuel nozzles is less continuously than the upstream constriction by said fuel injection devices. The fuel injection devices may comprise edges behind said main fuel nozzles to cause turbulences to improve the mixing of said fuel with said gas turbine process fluid. These edges may coincide with an abrupt axial end of said fuel injection devices causing a significant recirculation zone in the downstream flow to enable a stable flame front position.

Advantageously said pilot injector(s) may be located in the area of said recirculation zone.

BRIEF DESCRIPTION OF THE DRAWINGS

Below embodiments are described partly in closer detail with reference to accompanying drawings to give a better understanding of the invention and optional features, wherein FIG. 1 a simplified drawing showing a cross sectional view of the assembly according to the invention comprising the gas turbine, lines 1 and 2, said solar receiver and said heat exchanger, FIG. 2 showing a detail of FIG. 1 depicting a burner of a combustor of said gas turbine, FIG. 3 showing a perspective indicated in FIGS. 1 and 2 by III, FIG. 4, 5 showing details of FIG. 2 indicated in FIG. 2 by IV, V.

DETAILED DESCRIPTION OF INVENTION

Figure 1:
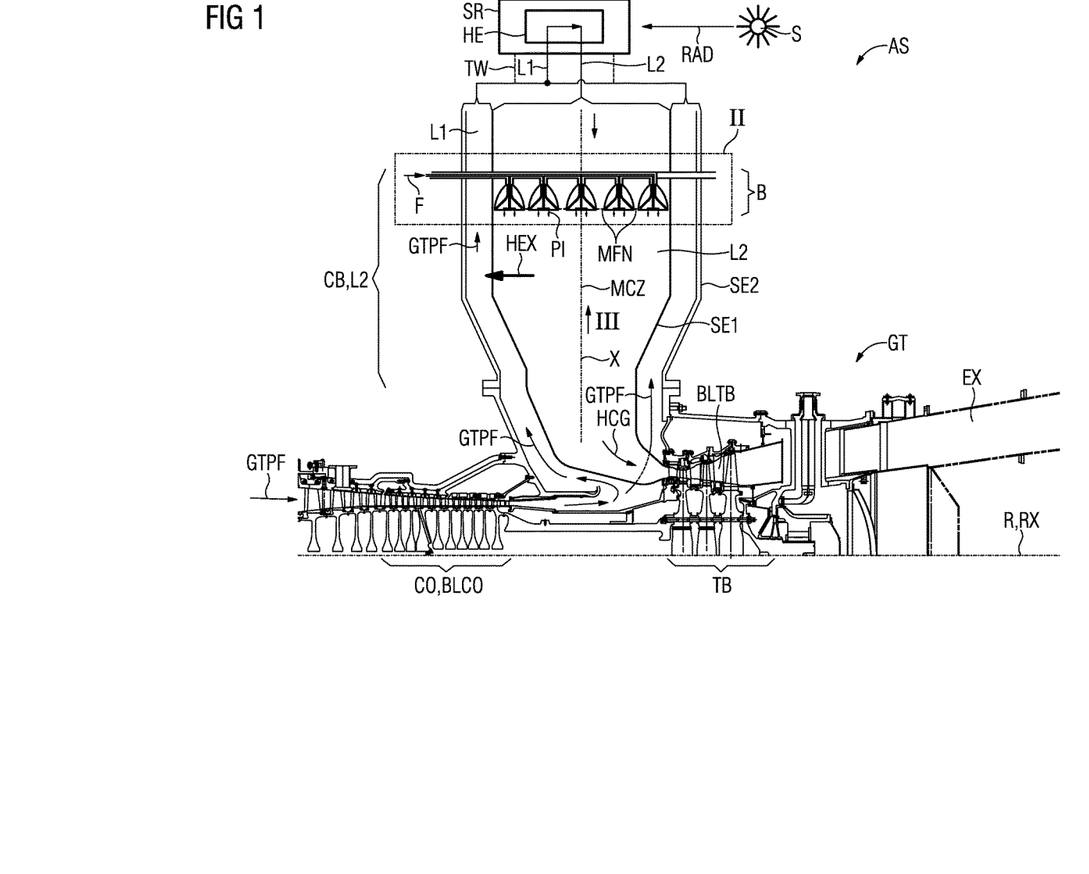

FIG. 1 shows an assembly AS according to the invention comprising a gas turbine GT and a solar receive SR receiving radiation RAD as solar energy from the sun S.

Said gas turbine GT comprises—in the flow direction of a gas turbine process fluid GTPF, wherein said gas turbine process fluid GTPF is an oxygen containing gas—here ambient air—, a compressor CO comprising compressor blades BLCO, a first line L1 conducting said compressed gas turbine process fluid GTPF while cooling a combustor CB vertically up a tower TW of said solar receiver SR into a heat exchanger HE of said solar receiver SR receiving thermal energy from said radiation RAD. Downstream said heat exchanger HE said heated up gas turbine process fluid GTPF is conducted by a second line L2 vertically down to said combustor CB of said gas turbine GT. The combustor CB converts said gas turbine process fluids GTPF into hot combustion gas HCG by burning fuel F with the oxygen of said gas turbine process fluids GTPF. Said hot combustion gas HCG is expanded in a turbine TB comprising turbine blades BLTB of said gas turbine and finally released into an exhaust EX of said gas turbine GT.

After the compression said gas turbine process fluid GTPF exchanges heat as it enters said first line L1, which is adjacent to said second line L2, wherein said first line L1 coaxially surrounds said combustor CB, which is the continuation of said second line L2. Said first line L1 is build coaxially surrounding said second line L2, wherein an axis X of coaxiality is defined by the major flow direction of said gas turbine process fluid's GTPF—respectively said hot combustion gas' HCG generated—main flow direction through said second line L2 respectively said combustor CB. Said combustor CB is built as the continuation of said second line L2 as being defined by a first shell element SE1, which is cooled by said gas turbine process fluid GTPF being conducted by a second shell element SE2, which is at least partly surrounding said first shell element SE1.

In particular—as depicted—the continuation of said second line L2 joining into said combustor is without change of the cross section area CSA of said second line to avoid turbulence respectively to keep the flow as laminar as possible avoiding pressure loss increase.

As also shown schematically in FIGS. 2, 3, 4 and 5 said combustor CB comprises a burner B at an inlet, which is located at an upstream end of said combustor CB. As shown in the embodiment said combustor is a cylindrical continuation of said second line L2 with constant cross sectional area CSA. As shown, this cylinder can have a round cross sectional area CSA.

Said burner B is fixedly mounted at the upstream end of said combustor CB, comprising several fuel injection devices FID basically arranged in one axial plane XP extending perpendicular to said central axis X, defined by the main flow direction of said gas turbine process fluid GTFP respectively said hot combustion gas HCG through said combustor CB. The fuel injection devices FID comprise pilot injectors PI and/or main fuel nozzles MFN. Here each fuel injection device FID is shown with both, main fuel nozzles MFN and pilot injectors PI.

Figure 2:
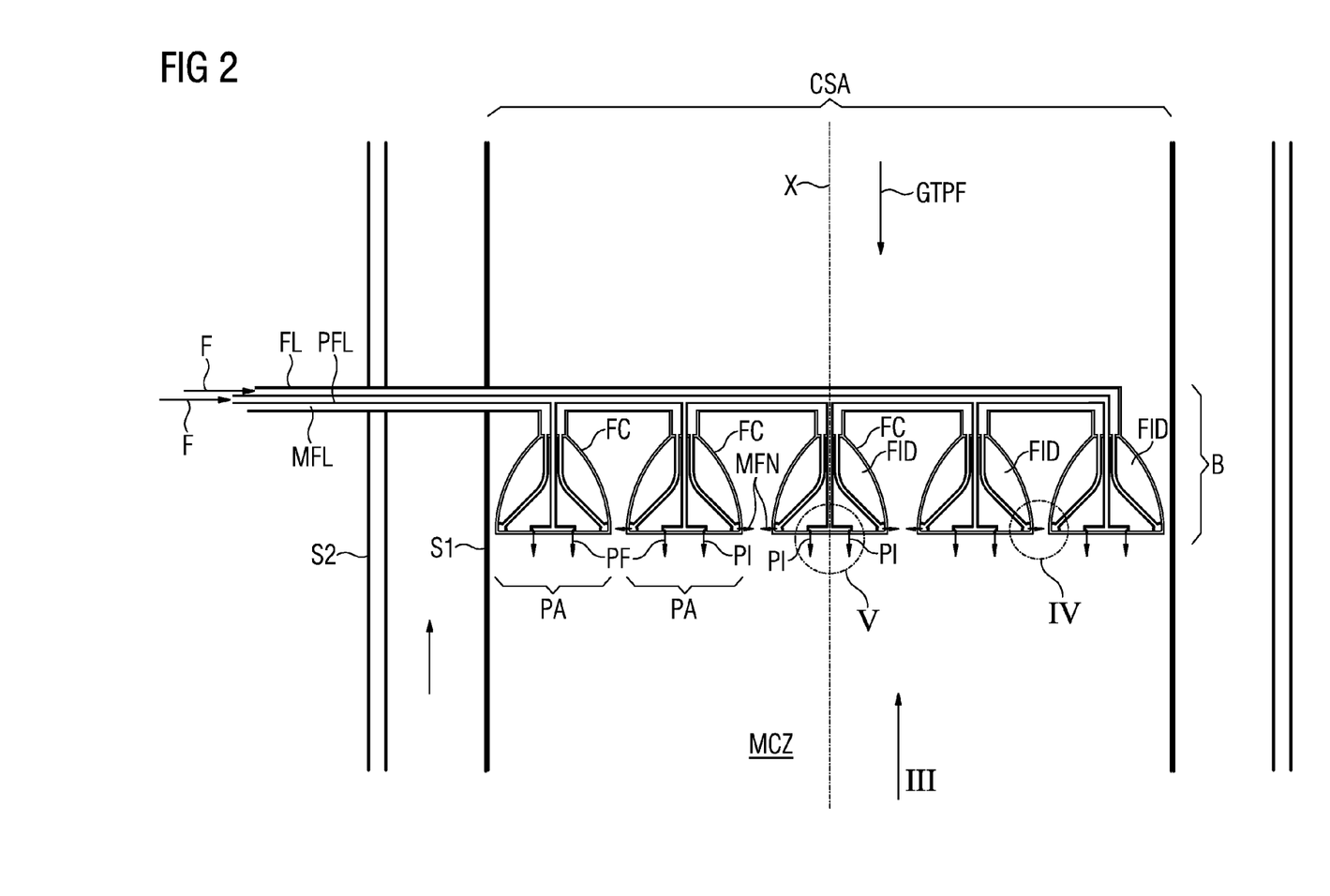
Figure 3:
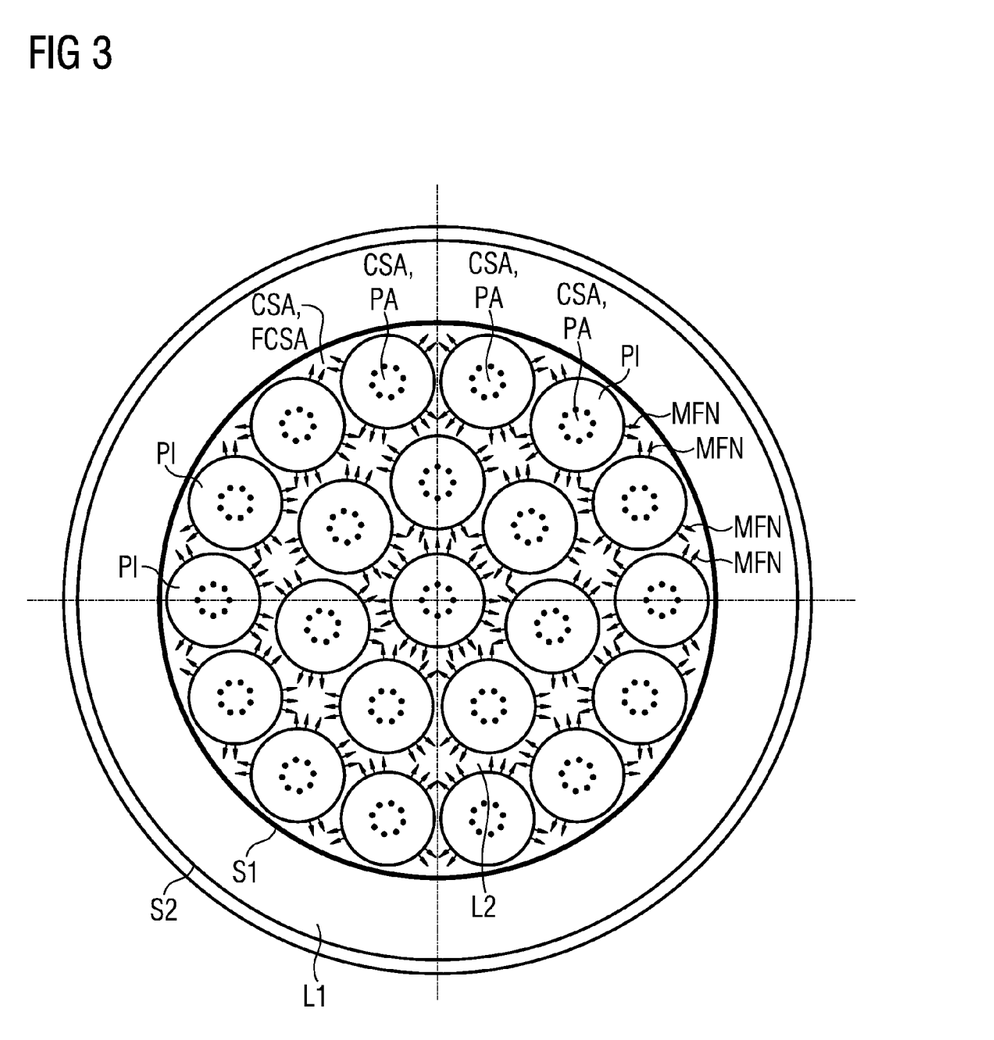
Figure 4:
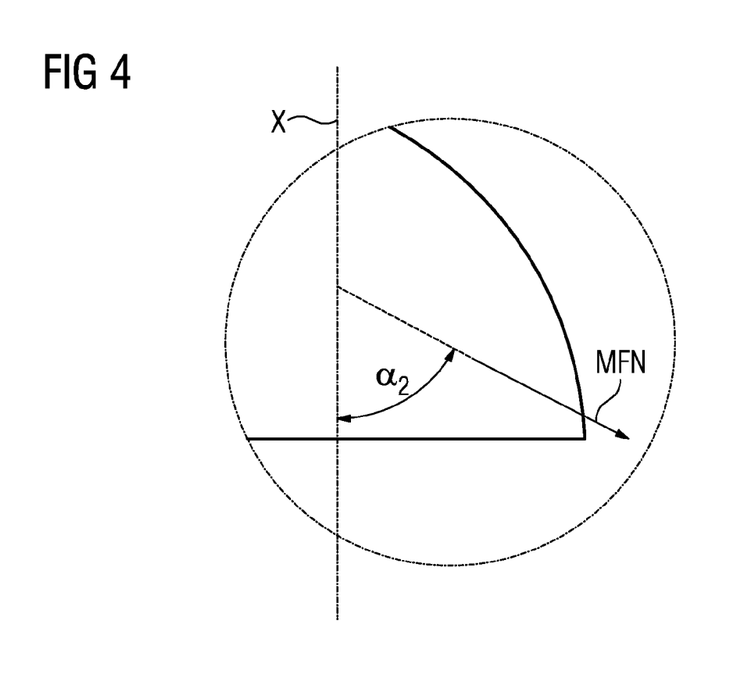
Figure 5:
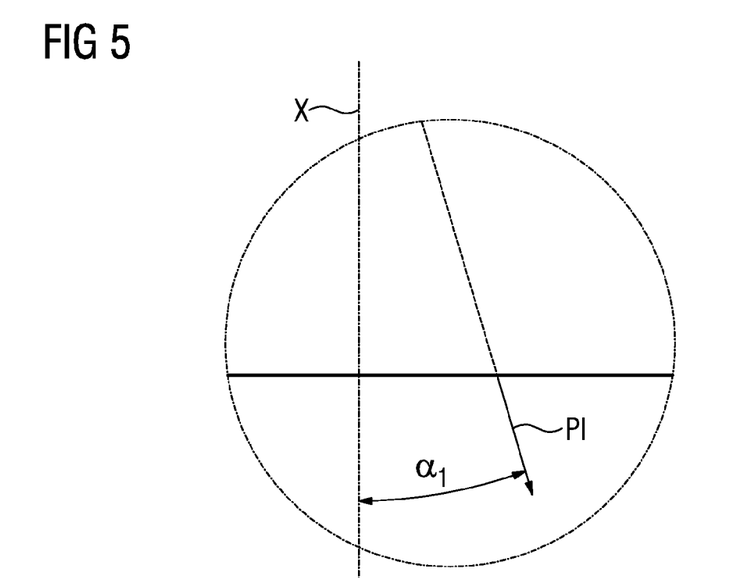

Each fuel injection device FID receives in particular its gaseous fuel F through a fuel line FL, which is advantageously adjusted to provide the same fuel pressure to each fuel injection device FID. This can be done by a sufficiently big main fuel line FL cross sectional area and sufficiently big subsequent fuel lines to avoid excessive pressure loss in said fuel line(s) FL. Further said pilot injectors PI and said main fuel nozzles MFN may have separate fuel supply lines, as shown in FIG. 2 said pilot injectors PI are fed with fuel by pilot fuel lines PFL and said main fuel nozzles MFN are provided with fuel by main fuel lines MFL.

Each fuel injection device FID occupies a part area PA of said cross sectional area CSA of said second line L2. This part area PA forces said gas turbine process fluid GTPF to be accelerated through the remaining free cross sectional area FCSA between said fuel injection devices FID. To reduce turbulence during this acceleration and to avoid an unnecessary high pressure loss each fuel injection device FID is equipped with an upstream flow contour, which reduces the respectively remaining cross sectional area CSA with axial progression not abruptly but continuously over at least a part of the axial extension of said flow contour FC.

Said main fuel nozzles are arranged downstream of at least the major part of the axial extension of said flow contour FC of said fuel injection devices FID to inject said major portion of fuel F into the accelerated flow of said gas turbine process fluid GTPF. Downstream said main fuel nozzles MFN a less continuous enlargement of said free cross sectional area FCSA of said second line L2 is achieved by a less continuous size reduction of said fuel injection devices with axial progression. Basically the fuel injection device axially ends abruptly at the axial location of said main fuel nozzles MFN.

Said pilot injectors PI are arranged downstream said main fuel nozzles MFN. This enables ignition and maintenance of a flame front in a main combustion zone MCZ of said combustor CB downstream said burner B. In particular and as depicted said pilot injector PI is located and injects a pilot fuel PF into the recirculation zone established by the location of the fuel injection device FID in the flow of said gas turbine process fluid GTPF.

Said pilot injector PI injects fuel F along an angle α1 between 0° and 45° (here α1 equal) 0° particularly between 0° and 10° with regard to said central axis X. Said main fuel nozzles MFN inject fuel F or a mixture of fuel F and said gas turbine process fluids GTPF along an injection angle α2, which is larger than the injection angle α1 of the pilot injector PI and particularly 90° respectively perpendicular to said central axis X (α2 equal 90° is shown in this embodiment).

Figure 6:
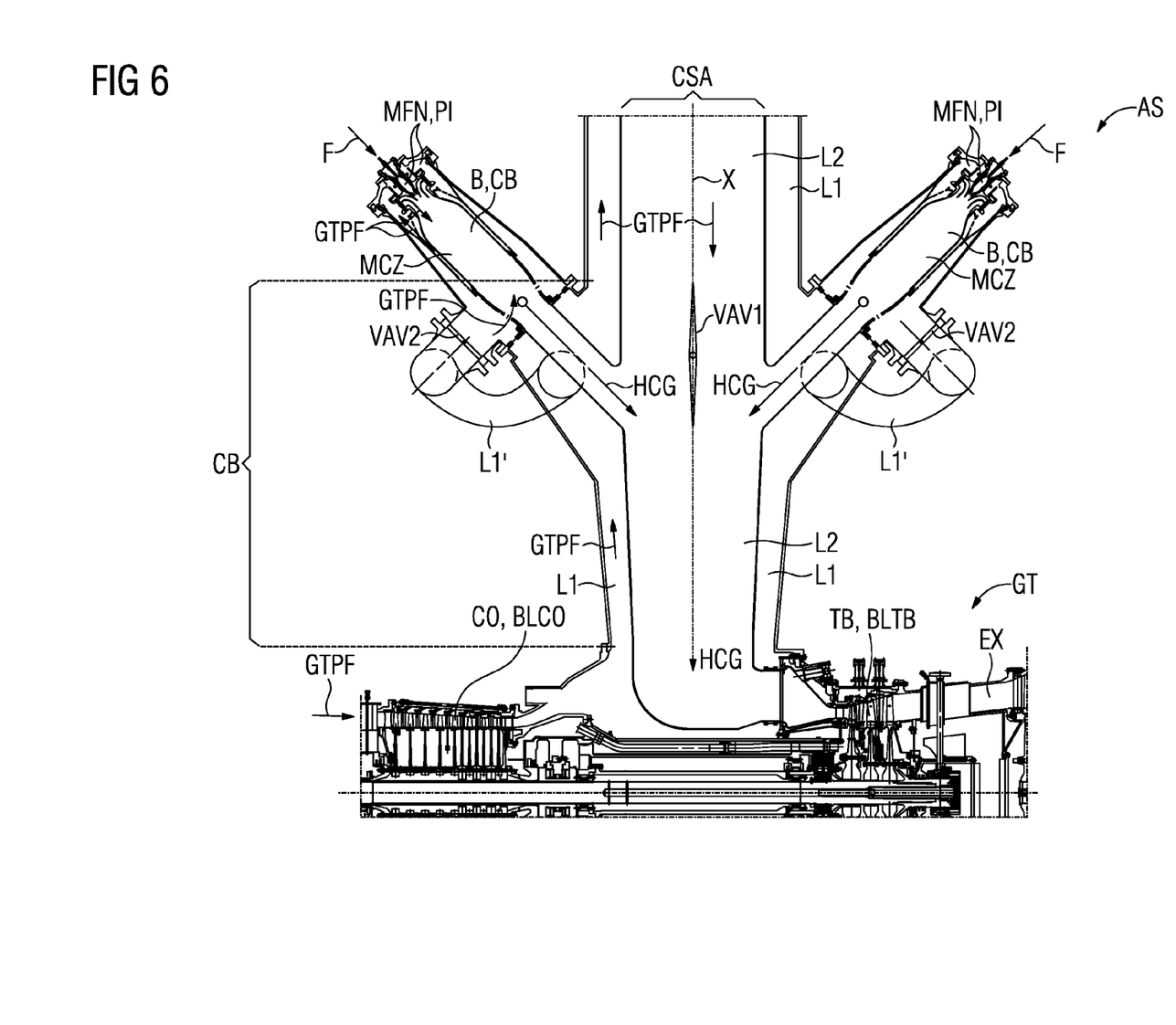
FIG. 6 a simplified drawing showing a cross sectional view of the assembly according to the invention comprising the gas turbine, lines 1 and 2, said combustor and a valve system enabling power shifting between solar receiver and combustor.

FIG. 6 shows another embodiment of the invention comprising similar components in a similar depiction to FIG. 1. Said solar receiver SR with said heat exchanger HE is not shown but to be assumed as depicted in FIG. 1. The embodiment according to FIG. 6 differs from FIG. 1 by having different burners B as part of the combustor CB. Further a valve system comprising a first valve VLV1 and second valves VLV2 enable to control the gas turbine process fluid GTPF flow depending on different operation modes. If sufficiently sun radiation provides enough solar power to operate the solar receiver SR said gas turbine process fluid GTPF enters downstream said compressor CO said first line L1 up to said solar receiver similar to the depiction in FIG. 1. If said solar receiver SR covers the total thermal energy consumption of said gas turbine GT said second valve VAV2 is closed and the total amount of said gas turbine process fluid GTPF enters through said first line L1 said solar receiver SR. If said solar receiver SR doesn't cover the total thermal energy needed to operate said turbine TB said first valve VAV1 closes and said second valve VAV2 opens and said gas turbine process fluid GTPF enters a first line bypass L1' to be led into said burner B for generating hot combustion gas HCG by burning fossil fuel F in said burner B. Said burner B comprises a pilot combustion zone PCZ to generate a rich hot combustion gas HCG (rich means that unburned fuel is mixed to the gas) to be ejected into a main combustion zone MCZ to react with the heated up remaining gas turbine process fluid GTPF. In the main combustion zone MCZ of said combustor CB said gas turbine process fluid GTPF mixes with the hot combustion gas HCG and remaining unburned fuel F is burned with the oxygen contained in said heated up gas turbine process fluid GTPF. The gas turbine shown in FIG. 6—especially the burner and the turbine in particular are designed as a low temperature devices operating at a temperature up to 1000° C. This turbine therefore doesn't need any supplementary firing by fossil fuel downstream said heat exchanger HE.

If said solar receiver SR does not produce enough thermal energy to be efficiently operated (for example at night) said first valve VAV1 blocks said second line L2 upstream of said combustor CB totally and instead to exclusively conduct said gas turbine process fluid GTPF downstream said compressor along said first line bypass L1' in particular through said fully opened second valve VAV2 to generate hot combustion gas HCG by said burner B. Said burner B is then operated in a mode allowing to cover the full thermal energy to be generated exclusively in said main combustion zone MCZ, which ejects readily composed maybe fully reacted hot combustion gas HGC into the main combustion zone MCZ downstream said first valve VAV1.

The invention claimed is:

1. An assembly comprising:
a gas turbine and a heat exchanger for heating up a gas turbine process fluid by thermal energy, said gas turbine comprising a compressor, a combustor and a turbine downstream said combustor,
wherein said assembly comprises a first line to conduct said gas turbine process fluid from said compressor to said heat exchanger, and
wherein said assembly comprises a second line to conduct said gas turbine process fluid from said heat exchanger to said combustor to generate hot combustion gas from warmed up gas turbine process fluid burning fuel in said combustor,
wherein said combustor is defined by a first shell element containing a main combustion zone,
wherein said combustor is at least partly surrounded by a second shell element to provide an annular channel between said first shell element and said second shell element as a part of said first line.

2. The assembly according to claim 1,
wherein said first line and said second line exchange heat.

3. The assembly according to claim 2,
wherein said first line and said second line are arranged coaxially to each other along at least a portion of their respective length.

4. The assembly according to claim 1,
wherein flow directions of said gas turbine process fluid in said first line and said second line are contrary.

5. The assembly according to claim 1,
wherein said combustor comprises a burner upstream said main combustion zone, wherein said burner comprises main fuel nozzles to supply said fuel by the main fuel nozzles and at least one pilot injector to ignite and/or maintain combustion by said at least one pilot injector.

6. The assembly according to claim 5,
wherein said combustor comprises a central axis extending along a main flow direction of said gas turbine process fluid through said combustor,
wherein said at least one pilot injector injects said fuel along a first inclination angle $\alpha 1$ to said central axis,
wherein: $0°<\alpha 1<45°$.

7. The assembly according to claim 6,
wherein said main fuel nozzles inject said fuel along a second inclination angle $\alpha 2$ to said central axis,
wherein: $\alpha 2 > \alpha 1$.

8. The assembly according to claim 7,
wherein: $0°<\alpha 1<10°$ and $45°<\alpha 2<120°$.

9. The assembly according to claim 8,
wherein said burner comprises fuel injection devices respectively comprising at least one pilot injector and/or at least one main fuel nozzle and respectively connected to a fuel supply line,
wherein said fuel injection devices are arranged in an axial plane perpendicular to said central axis.

10. The assembly according to claim 9,
wherein the fuel injection devices occupy a part area of a cross sectional area perpendicular to said central axis of said combustor, thereby restricting a free cross sectional area available for a flow of said gas turbine process fluid, and
wherein a front face's part area of each fuel injection device facing oppositely the flow of said gas turbine process fluid is covered by a respective flow contour extending axially such that a constriction of said free cross sectional area by the fuel injection devices is made continuously along at least a part of an axial extension of said fuel injection devices.

11. The assembly according to claim 10,
wherein an enlargement of said free cross sectional area by the fuel injection devices and downstream of respective at least one main fuel nozzles is made more abrupt than the constriction by said flow contours.

12. The assembly according to claim 7,
wherein: $0°<\alpha 1<10°$ and $\alpha 2=90°$.

* * * * *